Aug. 27, 1968   W. T. DEIBEL   3,398,814
AUTOMOTIVE VEHICLE BRAKES
Filed Jan. 9, 1967   3 Sheets-Sheet 1

INVENTOR.
WILLIAM T. DEIBEL

INVENTOR.
WILLIAM T. DEIBEL

INVENTOR.
WILLIAM T. DEIBEL

United States Patent Office 3,398,814
Patented Aug. 27, 1968

3,398,814
AUTOMOTIVE VEHICLE BRAKES
William T. Deibel, Marion, Ohio, assignor to Eaton Yale & Towne Inc., Cleveland, Ohio, a corporation of Ohio
Filed Jan. 9, 1967, Ser. No. 608,091
3 Claims. (Cl. 188—78)

ABSTRACT OF THE DISCLOSURE

Truck brake or the like, wherein bolts, on the inside of the wheel, in alignment with the axle, can be removed to free the shoe and its worn lining from the shoe carrier. The lower shoe is removed by a straight axial pull. The upper shoe is unbolted, then turned peripherally to the bottom of the wheel, and similarly removed by a straight axial pull. Wheels are not removed. Brakes are adjusted to receive new linings, which are applied by reverse process; and vehicle is fully operational.

---

This invention relates to brakes for automotive vehicles and, more particularly, to brakes wherein the linings can be replaced without jacking up the vehicle axle and removing the wheel and drum.

THE PROBLEM

Heavy-duty trucks used in construction, logging, mining, and long distance hauling, through mountainous terrain, represent a very high investment for the owner. As a result, they must be kept in constant use in order to be profitable. Down time of any kind is very costly.

These vehicles are subject to continuous heavy-duty service which requires frequent and heavy brake applications for load stopping. The result is that the linings wear out very fast. Vehicles of this type typically require lining replacement at intervals from every twelve weeks up to, in some severe cases, everyday.

By the old method of changing linings, it was necessary to jack up the axle, unbolt and remove the axle shaft, and then pull the wheel assembly, including the hub, brake drum, wheel and tires, so that the shoes with worn linings could be removed and shoes with new linings installed. Therefore, this method of pulling the drum each time the linings are replaced amounts to substantial and completely lost effort, because it is not required for lining maintenance. Further, the down time for the vehicle is substantially increased, resulting in reduced utilization of this capital equipment.

Further, hub removal usually requires replacing the wheel bearing seals and axle shaft gaskets. This is unnecessary except when the drums need to be removed, in order to be turned, or need to be removed so that the bearings can be exposed and lubricated. These service operations are required much less frequently than lining replacement.

It will be evident from the foregoing that a substantial advancement to the art would be provided by brakes in which the shoes and linings could be replaced without removing the wheel and drum. This would make it possible for a truck or vehicle to be quickly serviced with a minimum of time, labor and equipment. This would provide more efficient use of the heavy investment in the equipment to which applied.

It is an object of this invention to improve the truck brake art with a novel brake wherein the linings can be removed from the truck, while the truck is in an operating condition, and even while the truck is loaded.

This invention provides a substantial contribution to the art of heavy-duty automotive vehicle brakes, such as truck brakes and the like, by providing a brake shoe that is made in two parts, and which is accessible from the inside of the wheel. The shoe carrier portion remains on the brake assembly and the secondary portion, including a shoe and a brake lining attached thereto, is removable from the inside of the wheel while the wheel and drum are in place. This operation takes a very few minutes and can be effected by the mere expedient of adjusting the brakes to a position to permit the reinstallation of shoes with new and thicker linings.

Replaceable linings are not alleged to be new, per se, in the present invention. However, the particular structure and means of accomplishment disclosed herein are novel. Inwardly replaceable linings shown in the present art have substantial limitations. As will become evident herein, the limitations, disadvantages and complexities of the prior art are overcome and substantial improvements are provided by this invention.

Before describing in detail the present invention, it is pertinent to point out that the prior art, in situ, inwardly replaceable brake lining mechanisms have required both a radial movement of the shoe, which is the replaceable part of the brake, and then a circumferential movement. In most cases with the usual systems found in use today, it is flatly impossible to adjust the brake to a point where a shoe with new linings can be inserted into the drum and then moved radially inward for attachment. Also, in many instances on complex axles, there is so much interfering hardware that the other movements required cannot be effected. Therefore, the prior art structures, which provided advancement to the art, are limited because of their construction, to special vehicles or axles designed to accommodate the special movements required for shoe removal.

However, in the present invention a very substantially simplified construction is provided for application to a greater variety of axles, for greater ease of replacement, and for substantially improved economy of manufacture.

Referring now to the drawings.

Figure 1:
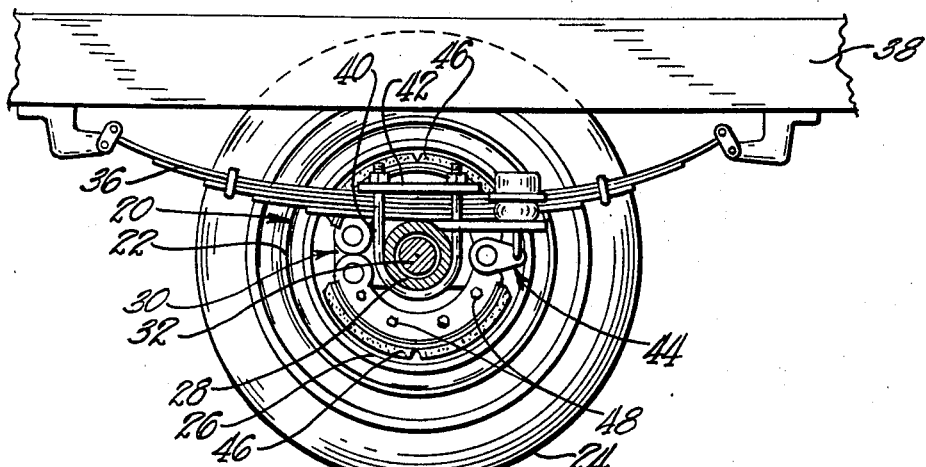
FIGURE 1 is a view in side elevation of a wheel installation of a truck or trailer, the view being taken from the inner side of the wheel.

Referring now more particularly to the drawings, and especially to FIGURE 1, the truck or tractor wheel assembly comprises a wheel 20, including a rim 22, having a tire 24 secured thereto. An inwardly and axially extending brake drum 26 also comprises part of the assembly.

An axle housing 28 has a radially extending flange, not shown, upon which the brake mechanism 30 is mounted in a conventional manner. Within the axle housing 28, there is mounted a rotatable drive shaft 32 having a radially extending flange at the end, not shown, which by engaging the hub through a plurality of studs, drives the wheel assembly. The wheel 20 and drum 26 are carried on the housing 28 by roller bearings and secured in place with nuts threaded onto the extremity of housing 28. This is the conventional arrangement used in heavy trucks and is what is described as a "full-floating" axle.

In trucks and trailers the brake housing space defined radially inwardly of the brake drum 26 is unenclosed at the inner side of the wheel, except for splash covers 34, FIGURE 2, to be later described. However, this space is blocked to a considerable degree adjacent to its upper portion, as by the support springs 36, for the chassis 38. Also, the spring clip 40 and the hold-down plate 42 and the brake control means 44 block access to the upper portion of the inside of the wheel. In many cases, these blocking elements are located sufficiently close to the brake housing space to render it impossible to effect removal of the upper brake shoe 78 by axial movement of the same relative to the drum.

Further, there is a very limited amount of space (only a few thousandths of an inch) for radial movement of the brake shoes 78 when reinstalling, as has been attempted in the prior art.

Figure 2:
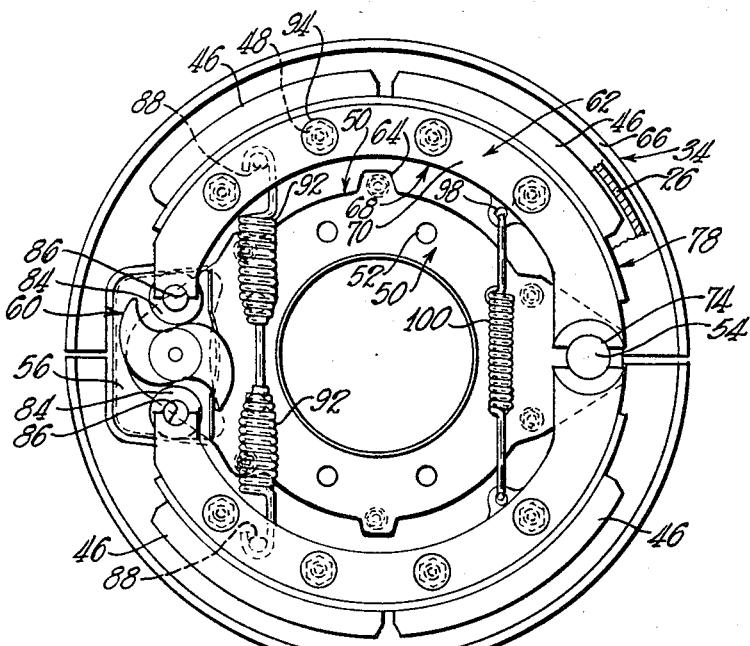
FIGURE 2 is an enlarged side-elevational view, partly in section, of an assembled brake mechanism having the novel brake assembly of the present invention therein, taken from the outside of the wheel.
Figure 3:
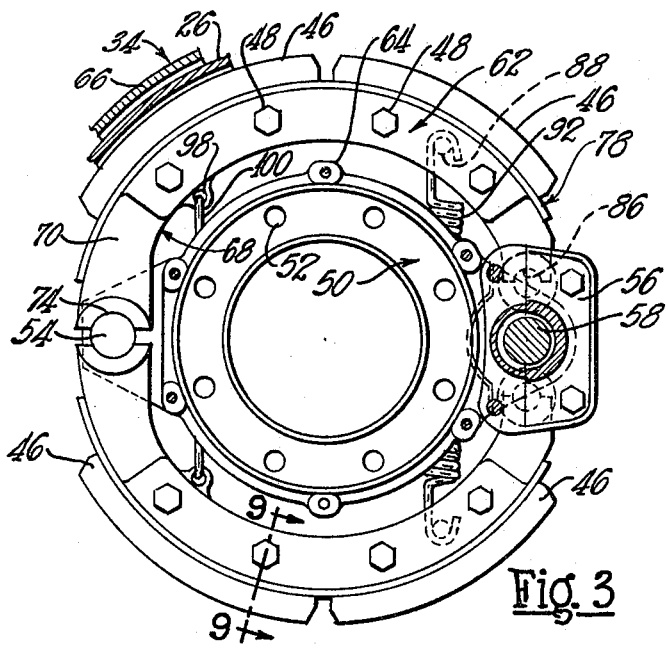
FIGURE 3 is a side-elevational view, similar to FIGURE 2, but from the inside of the wheel.
Figure 9:
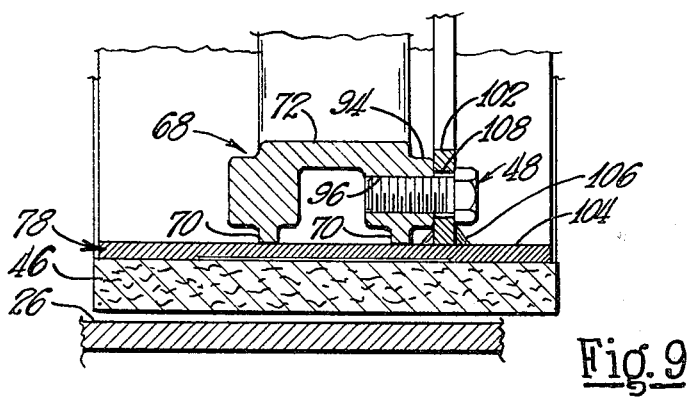

However, this brake housing space is not fully blocked from the standpoint of access by hand to axially extending fastening bolts 48, as used in the present invention, see FIGURES 2, 3 and 9.

Therefore, by the present invention, the removal and replacement of the linings 46, without removal of the wheel 20, is possible even with such limited access.

The manner in which such removal and replacement of the brake linings are accomplished will be described later.

First, however, the specific construction of the brake of invention will be described.

As shown in FIGURE 2, the brake shoe mounting spider 50 is fastened to the axle housing 28, FIGURE 1, for support of all the brake mechanism. The spider 50 has a plurality of holes 52 through which bolts, not shown, are inserted for mounting it to the conventional radial flange of the axle housing 28, FIGURE 1.

Also, the spider 50 has a brake shoe anchor pin 54, at one end. At the other end, there is a bored lug 56 through which the shaft 58, FIGURE 3, of an S-cam 60 is rotatably mounted. Rotation of the S-cam 60 as by an air motor mechanism 44, FIGURE 1, suitably connected to the shaft 58, provides actuation of the brake shoe and carrier assemblies 62, as will be described later.

THE PROTECTIVE COVERS 34

As shown in FIGURE 2, splash covers 34 are bolted to attachment lugs 64 formed on the back or inside of the brake spider 50. The attachment lugs 64 are also more clearly shown in the inside view of FIGURE 3. In that view, however, the covers 34 are omitted except for a fragment outside of a fragmentary piece of brake drum 26.

The splash covers 34 are contoured to fit around the bored lug 56, best shown in FIGURE 2, in which the shaft 58 of the S-cam 60 is rotatably mounted. Also, the splash covers 34 are contoured to extend in and fit close around the spider 50 thereby providing effective splash and dust protection for the brakes. Each splash cover 34 includes an axially extending lip 66 within which the brake drum 26 is inserted, so to speak, to provide an overhanging protective shield. This coupled with the protection provided by the wheel rim 22, FIGURE 1, provides a labyrinth-type covering which effectively keeps out road splashed water and dust.

THE BRAKE SHOE CARRIERS

Figure 4:
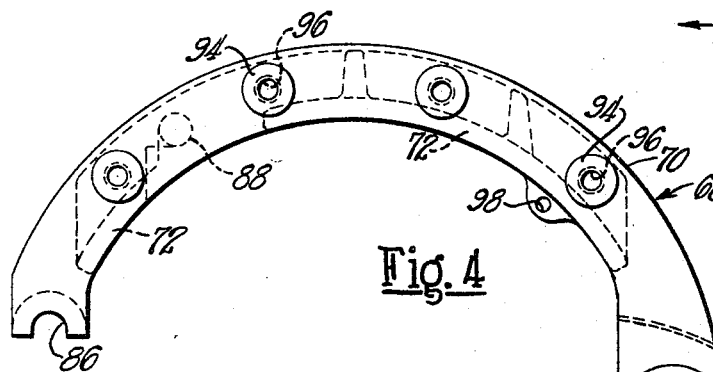
FIGURE 4 is a side-elevational view of the shoe carrier of invention.
Figure 5:
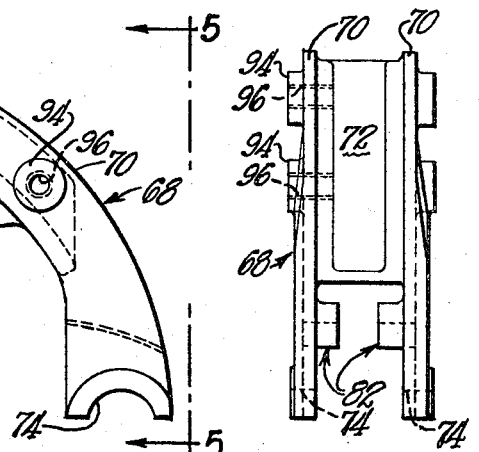
FIGURE 5 is an elevational view taken along the line 5—5 of FIGURE 4.

The brake shoe carriers 68 are best shown in FIGURES 4 and 5. Each carrier 68 comprises a pair of spaced arcuate web members 70 that are flat in the radial direction, but curved in the circumferential direction. A rib 72 extends between the arcuate web members 70. The rib 72 is also an arcuate member, but flat in the axial direction and curved in the circumferential direction.

Each of the main arcuate members 70 is provided at one end with an arcuate recess or anchor pin slot 74 to provide for pivoting on the anchor pin 54 as shown in FIGURES 2 and 3.

As shown in FIGURES 4 and 5, a plurality of bolt bosses 94 are provided on each of the members 70. These are drilled and tapped at 96 to receive fastening bolts 48, FIGURES 3 and 9. FIGURE 9 also shows the bolt bosses 94. Within the scope of the invention, the bolt bosses 94 could be threaded studs to which nuts would be applied. Thus, the function of holding the brake shoe 78 could be provided in two analogous ways.

At the other end, each carrier member 70 is extended inwardly at 82, as best shown in FIGURE 5, to form a narrower throat to embrace a roller pin 84, FIGURE 2. Also, an arcuate roller pin slot 86 is formed at the end of each member 70.

It is to be understood that there are two brake shoe carriers 68 in each wheel, which are mirror images of each other. It will also be understood that the left hand and right hand wheels are mirror images of each other for purposes of practical application, the drawings of this application showing only one wheel and only one brake shoe carrier 68 and only one brake shoe 78. The mirror image units have not been shown because they are not necessary to a full and complete understanding of the principles involved in the present invention.

A spring anchor pin boss 88, FIGURE 4, extends between members 70. As shown in FIGURE 2, a brake shoe return spring 92 has each of the ends hooked over the spring anchor bosses 88 for returning the brake shoe assemblies 62 to an inactive position after actuation.

Additionally, as shown in FIGURES 2, 3 and 4, a brake spring hook hole 98 is provided in a member 70 of each brake shoe carrier 68. A retaining spring 100, FIGURE 2, has each end hooked in the holes 98 for holding the brake shoe carriers 68 and the shoes 78 in engagement with anchor pin 54.

THE REPLACEABLE BRAKE SHOES, IN DETAIL: FIGURES 6 AND 7

Each brake shoe 78 comprises a web plate 102 that is flat in the radial direction and curved in the circumferential direction. The brake lining support plate 104 is also an arcuate platform, but flat in the axial direction and curved in the circumferential direction. The brake lining support plate 104 and the web plate 102 are attached together at 106 by welding or other suitable means.

Figure 6:
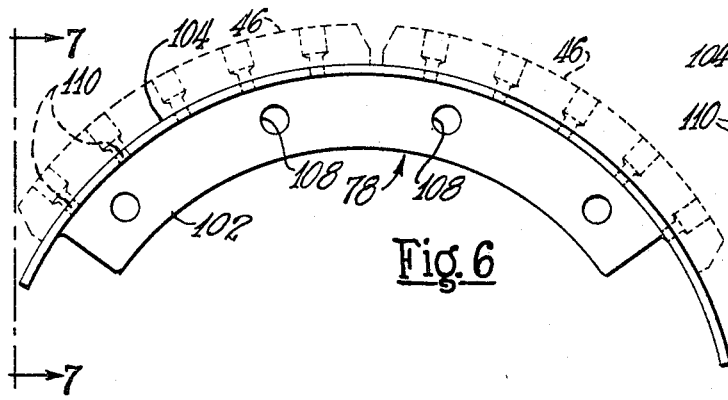
FIGURE 6 is a side-elevational view of the brake shoe of the invention.
Figure 7:
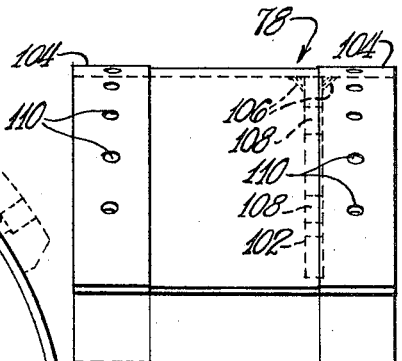
FIGURE 7 is an elevational view taken along the line 7—7 of FIGURE 6.

As best shown in FIGURE 6, a plurality of bolt holes 108 are provided in the web plate 102. These are spaced identically to the holes 96 of the arcuate members 70 of the shoe carrier 68, as shown in FIGURE 4, and shown superimposed in FIGURE 3. Thus, bolts 48, FIGURE 9, can be passed through the holes 108 and 96 for attaching the brake shoe units 78 to the carriers 68 as shown in FIGURE 9.

Brake lining rivet holes 110 are formed in the brake lining support plates 104 and corresponding countersunk rivet holes are formed in the lining 46 so that the linings can be attached to the support plates 104 of the brake shoes 78. Bonded linings could also be used.

REMOVAL AND REPLACEMENT OF THE BRAKE LININGS IS ACCOMPLISHED IN THE FOLLOWING MANNER

It has previously been pointed out that prior art replaceable brake elements have required both a radial movement of the shoe, which is the replaceable part of the brake, and then a circumferential movement. It has been pointed out also that in many instances on complex axles, there is so much interfering hardware that these movements cannot be effected. Therefore, the prior art structures, though providing an advancement to the art, are limited because of their construction, to specific vehicles or axles wherein the amount of obstructing hardware is kept to a low level.

As will now become apparent, the present invention provides a replaceable brake lining that is very easy to not only remove and put in place, but also very easy to unbolt for removal and then bolt in fixed position after replacement.

First, the dust covers 34 are removed by unbolting the retaining bolts, not shown, from the attachment lugs 64.

Figure 8:
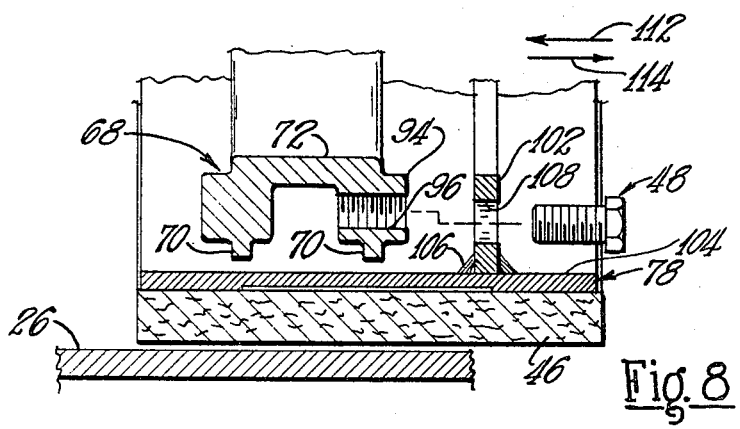
FIGURE 8 is an exploded sectional view showing the insertion and removal of the brake shoe onto the carrier; and, FIGURE 9 is a sectional view illustrating the brake shoe assembled to the carrier for use, as taken along the line 9—9 of FIGURE 3.

FIGURES 8 and 9 represent the bottom side of the brake drum or the bottom side of the wheel in order to show insertion or removal of a brake shoe 78 at the lower side of the wheel assembly where the axle is not obstructed, see FIGURE 1 of the drawings, either by the spring 36 or by the brake control means 44.

By referring to FIGURE 1, it will be observed that the lower shoe 78 can be easily removed by removing the bolts 48, FIGURE 9, and simply sliding the brake shoe 78 to the right in the arrow direction 114 as in FIGURE 8. Note that no radial movement, at all, is required, as in the prior art.

Thereafter, reference FIGURE 3, the upper bolts 48 are removed, thus freeing the upper brake shoe 78. Because, FIGURE 1, the upper side of the wheel is obstructed by the spring 36 and the brake control means 44, axial movement of the upper shoe 78 cannot be effected. However, the upper shoe 78 will move freely circumferentially around to the left, FIGURE 3, to the bottom position where it can be withdrawn axially. This is illustrated by the arrow 114 in FIGURE 8.

For replacement, the above procedure is reversed. Note in FIGURE 8 that a shoe 78 with a new lining 46 is inserted in the arrow direction 112. It will be understood, however, that the brake shoe carrier 68 must be moved radially inwardly by adjusting the brakes to permit insertion of the new and thicker linings 46.

FIGURE 9 shows the installed position of a shoe 78 on the brake shoe carrier 68.

For insertion then, the upper shoe 78 is placed in at the bottom as in FIGURE 8, arrow 112, and moved circumferentially around to the top and bolted into place. Thereafter, the lower brake shoe 78 is inserted as in FIGURE 8, and bolted in place to provide the installed position of FIGURE 9.

It is to be noted that no problem is encountered with respect to tightening the bolts 48, because of the fixed condition of the bosses 94; and, an appropriate socket wrench or socket extension is used above and below as in FIGURE 1.

Then, after the shoes 78 are both installed, the dust covers 34 are bolted back in place.

At this time, the truck is again operational and can proceed immediately.

Extremely good support against radial braking pressures is provided for the shoes 78 and the linings 46 carried thereby, by the brake shoe carrier 68. Note FIGURE 9 for the manner in which the spaced arcuate members 70 of the brake shoe carrier 68 assume radial braking loads in a balanced manner. Further, note that the arcuate members 70 of the brake shoe carriers 68 provide contact points along the upper surfaces and thus frictionally engage the bottom side of the brake lining support plate 104 of the shoe assembly 78 to resist braking pressures from tending to move the shoes 78 and linings 46 in a circumferential direction. These frictional forces supplement the anti-rotational forces provided by the bolts 48, connecting the web plates 102 of the shoe assemblies 78 to the arcuate members 70 of the brake shoe carriers 68.

SUMMARY OF THE INVENTION

From the foregoing, it will be evident that a greatly improved, though simplified, replaceable brake shoe assembly has been provided in accordance with the present invention. Because of the fact that radial movement for removal and replacement has been eliminated, the present invention is applicable to a greater variety of axles, and axles having more interfering hardware, than has been possible with prior art structures, particularly those involving a radial movement before the lining carriers could be moved circumferentially.

It will be seen that the brake linings are firmly held on the brake shoes, but can be easily and quickly replaced when they become worn. Furthermore, it is not necessary to dismantle the mechanism at all when replacing the linings. Still further, the truck or trailer axle can have new brake linings applied without being unloaded. There will always be some clearance beneath the axle as shown in FIGURE 1 for brake lining replacement even though the vehicle is fully loaded.

I claim:

1. In a braking system of the class described, and including an axle-supported brake drum and a brake support spider positioned coaxial within said drum and supported from the axle,
   a brake shoe carrier having one end pivotally mounted to said spider,
   said brake shoe carrier being of arcuate contour and including a pair of axially spaced webs that are flat in the radial direction and curved in the circumferential direction, and said webs being bridged by a rib that is generally flat in the axial direction and curved in the circumferential direction,
   means normally biasing said brake shoe carrier toward the axis of said spider,
   power means for moving said brake shoe carrier radially outwardly in brake-actuating fashion,
   said brake shoe carrier having a brake shoe supporting surface,
   a threaded axially extending fastening element on one of said webs of said brake shoe carrier and spaced from said supporting surface,
   a brake shoe having a surface axially slidable on said brake shoe supporting surface of said carrier,
   and axially removable fastening means engaging said axially extending fastening element of said brake shoe carrier, operably holding said brake shoe on said brake shoe supporting surface.

2. The invention according to claim 1 wherein said fastening element on said web comprises a tapped hole, and wherein said releasable fastening means carried by said shoe comprises an axially aligned hole in said shoe and a bolt passed through said hole and into said tapped hole of said web.

3. The invention according to claim 1 wherein said fastening element on said web comprises a threaded stud secured thereto and extending therefrom, and said releasable fastening means carried by said shoe comprises an axially extending hole in said shoe, receiving said stud, and a nut on said stud securing said brake shoe to said carrier.

References Cited

UNITED STATES PATENTS

| | | | |
|---|---|---|---|
| 1,563,636 | 12/1925 | Lewis | 188—78 |
| 1,571,241 | 2/1926 | Down | 188—234 X |
| 1,636,686 | 7/1927 | Elliott | 188—78 |
| 2,770,328 | 11/1956 | Dombeck | 188—78 |
| 2,822,065 | 2/1958 | Goepfrich | 188—78 |

FOREIGN PATENTS 412,299  6/1934  Great Britain.

MILTON BUCHLER, *Primary Examiner.*

T. W. BUCKMAN, *Assistant Examiner.*